(12) United States Patent
Jones et al.

(10) Patent No.: US 6,571,780 B1
(45) Date of Patent: *Jun. 3, 2003

(54) AIR INDUCTION SYSTEM HAVING INLET VALVE

(75) Inventors: Daniel W. Jones, Lenexa, KS (US); Glennon J. Roderique, Lenexa, KS (US); Christopher S. Spies, Belton, MO (US)

(73) Assignee: Accessible Technologies, Inc., Lenexa, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/065,165

(22) Filed: Sep. 23, 2002

Related U.S. Application Data

(63) Continuation of application No. 09/681,945, filed on Jun. 28, 2001, now Pat. No. 6,474,318.
(60) Provisional application No. 60/301,264, filed on Jun. 27, 2001.

(51) Int. Cl.$^7$ ............................................... F02B 33/00
(52) U.S. Cl. ...................... 123/564; 123/559.1; 60/602; 60/611; 60/612; 137/219
(58) Field of Search ............................ 123/564, 559.1; 60/602, 611–612, 614, 624; 137/219

(56) References Cited

U.S. PATENT DOCUMENTS

| | | | | |
|---|---|---|---|---|
| 2,870,779 A | * | 1/1959 | Thomiszer | 137/219 |
| 3,576,102 A | * | 4/1971 | West | 60/612 |
| 3,921,403 A | * | 11/1975 | McInerney et al. | 60/609 |
| 4,258,550 A | * | 3/1981 | Hinkle et al. | 60/609 |
| 4,453,381 A | * | 6/1984 | Dinger | 60/612 |
| 4,505,117 A | * | 3/1985 | Matsuoka | 60/609 |
| 4,693,085 A | * | 9/1987 | Sumser | 60/611 |
| 4,903,488 A | * | 2/1990 | Shibata | 60/609 |
| 5,064,423 A | * | 11/1991 | Lorenz et al. | 60/611 |
| 5,365,908 A | * | 11/1994 | Takii et al. | 123/564 |

FOREIGN PATENT DOCUMENTS

| | | | | |
|---|---|---|---|---|
| JP | 358222919 A | * | 12/1983 | 60/610 |

OTHER PUBLICATIONS

Pat Ganah, *A Do–It–Yourself Guide to: Street Supercharging*, front and back, and pp. 1–3 and 74–87 (S–A Design Books) (1992).

* cited by examiner

*Primary Examiner*—Thomas Denion
*Assistant Examiner*—Thai-Ba Trieu
(74) *Attorney, Agent, or Firm*—Hovey Williams LLP

(57) ABSTRACT

An air induction system (10) for use with an internal combustion engine (E) including an intake is disclosed. The system (10) includes a supercharger (12) and a valve assembly. The valve assembly comprises a valve (14) and a valve control mechanism (16). The supercharger (12) receives air through a supply opening (18), pressurizes it, and discharges it through an exhaust opening (20). The valve (14) is in communication with the supply opening (18) to control air supply thereto. The control mechanism (16) is coupled to the valve (14) and causes it to vary the air supply to the opening (18) in response to air pressure conditions downstream from the supercharger (12). In one embodiment, the control mechanism (16) varies the air supply responsive to air pressure in the intake in order to both throttle the supercharger (12) as well as substantially eliminate undesirable surge conditions therein. In another embodiment, the control mechanism (118) varies the air supply responsive to air pressure in the inlet (110) of a turbocharger (106) to provide supercharged air thereto at a substantially constant pressure.

23 Claims, 4 Drawing Sheets

AIR INDUCTION SYSTEM HAVING INLET VALVE

CROSS REFERENCE TO RELATED APPLICATIONS

This application is a continuation of application Ser. No. 09/681,945, filed Jun. 28, 2001, now U.S. Pat. No. 6,474,318 which claims the priority of Provisional Application Serial No. 60/301,264, filed Jun. 27, 2001, both of the '945 and '264 applications being incorporated by reference herein.

BACKGROUND OF INVENTION

1. Field of the Invention

The present invention relates generally to air induction systems for providing increased airflow to the intake of an engine. More particularly, the present invention concerns a supercharger system having an inlet valve that varies the supply of air to the supercharger in response to air pressure conditions downstream from the supercharger. The downstream air pressure conditions can vary depending on the application and could include for example pressure conditions in the engine intake or pressure conditions in the inlet to a downstream turbocharger.

2. Discussion of Prior Art

Centrifugal superchargers that increase air flow to an engine (thereby increasing the power generated thereby) are known in the art and typically utilize a compressor powered by the engine's crankshaft to supply pressurized air, or "boost," to the engine. Known prior art centrifugal superchargers, however, are problematic and have several limitations. For example, conventional centrifugal superchargers have a somewhat linear boost response curve, therefore, if optimal boost is provided at higher engine rpms, the boost provided at lower engine rpms is significantly less than optimal. Conversely, if the typical centrifugal supercharger is set up to provide optimal boost at lower engine rpms, it will provide more boost than the engine can handle at higher engine rpms.

Known centrifugal superchargers are also problematic in that they suffer from undesirable surge conditions that are counterproductive to the operation of both the supercharger and the engine. For example, when a downstream restriction occurs, such as the closing of the engine throttle, the large pressure loads created can destroy the internal parts of the supercharger. Some prior art superchargers utilize a bypass valve that dumps the load into a recirculating line during these surge conditions; however, this bypass valve solution is problematic in that an undesirable pressure spike still occurs and the resulting pressure fluctuations can cause the mass flow meter to feed too much fuel into the engine.

Turbochargers, similar to superchargers, increase air flow to an engine; however, turbochargers utilize a compressor powered by the exhaust output by the engine. Known turbochargers also suffer from low-end boost problems, similar to those described above. Some prior art turbochargers utilize a supercharger upstream from the turbocharger, and powered by the engine's crankshaft, to supplement its low-end boost. These supercharged turbochargers, however, are problematic and have several limitations. For example, known supercharged turbochargers have an undesirable variance in the pressure supplied to the inlet of the turbocharger. That is, they are only supercharged at lower engine rpms and not operable to be supercharged at higher engine rpms. This is particularly problematic in high altitude applications wherein turbochargers typically do not supply sufficient boost for the desired engine power output. For example, diesel powered trucks frequently use turbochargers to boost engine power and these trucks are commonly used to transport heavy loads through high altitude conditions wherein the boost provided by the turbocharger at higher engine rpms is insufficient to desirably power the engine. Additionally, high altitude conditions lower volumetric efficiency and increase exhaust emissions.

SUMMARY OF INVENTION

The present invention provides an improved air induction system that does not suffer from the problems and limitations of prior art systems set forth above. The inventive system provides an inlet valve that varies the supply of air to the supercharger in response to air pressure conditions downstream from the supercharger. The valve can be used to both throttle the supercharger as well as substantially eliminate undesirable surge conditions therein by selecting pressure conditions in the intake to the engine as the controlling downstream pressure conditions. The inventive system can also be used to provide supercharged air at a substantially constant pressure to a turbocharger by selecting pressure conditions in the inlet to the turbocharger as the controlling downstream pressure conditions.

A first aspect of the air induction system of the present invention concerns a system for inducing airflow into the intake of an internal combustion engine. The system broadly includes a centrifugal supercharger presenting an air supply opening and a spaced pressurized air exhaust opening and being operable to pressurize air between the supply and exhaust openings, and a valve in communication with the supply opening to control air supply thereto.

A second aspect of the air induction system of the present invention concerns a valve assembly to be used in an air induction system that induces airflow into the intake of an internal combustion engine, wherein the induction system includes a compressor presenting an air supply opening and a spaced pressurized air exhaust opening communicating with the engine intake. The valve assembly broadly includes a valve fluidly connectable to the supply opening to control air supply thereto, and a valve control mechanism including an air pressure sensor adapted to sense air pressure downstream from the air exhaust opening. The valve control mechanism is operable to cause the valve to vary the air supply depending on the air pressure sensed.

Another aspect of the air induction system of the present invention concerns an air induction system in a powered vehicle including an engine. The induction system broadly includes a turbocharger operable to pressurize air and deliver it to the engine and including an inlet operable to receive air. The induction system further includes a supercharger in communication with the inlet and being operable to pressurize air and deliver it to the inlet, wherein the supercharger includes an air supply opening operable to receive air. In addition, the induction system includes a valve in communication with the supply opening and being operable to vary air supply thereto so that air pressure of the pressurized air delivered to the inlet remains substantially constant.

Other aspects and advantages of the present invention will be apparent from the following detailed description of the preferred embodiments and the accompanying drawing figures.

BRIEF DESCRIPTION OF DRAWINGS

Preferred embodiments of the invention are described in detail below with reference to the attached drawing figures, wherein.

DETAILED DESCRIPTION

Figure 1:
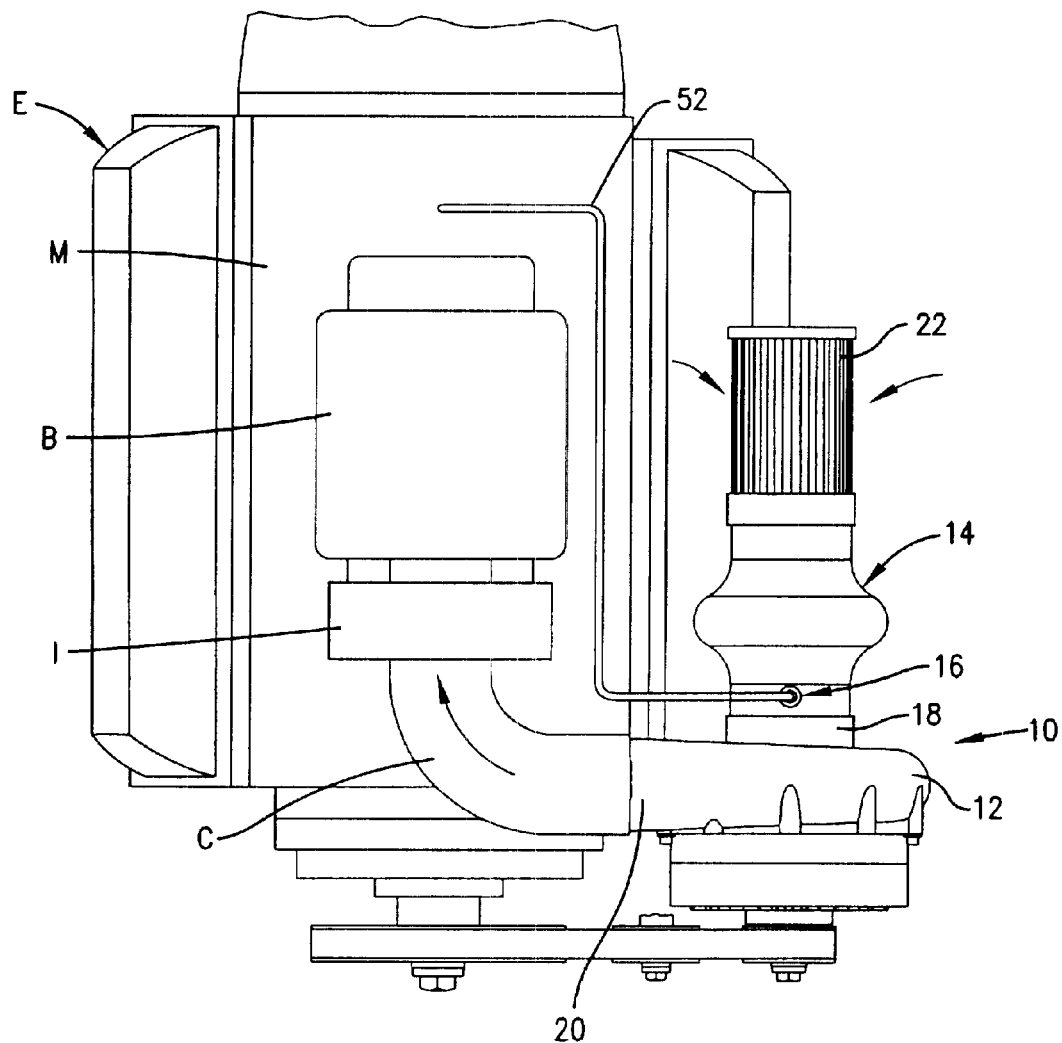
FIG. 1 is a plan view of an air induction system constructed in accordance with a preferred embodiment of the present invention and shown in combination with an internal combustion engine (illustrated in a fragmentary and partially schematic view)

Turning initially to FIG. 1, the air induction system 10 selected for illustration is shown in use with an internal combustion engine E of a vehicle such as a boat or automobile. Although the illustrated engine E has eight cylinders, the principles of the present invention are equally applicable to various other types of engines. It is noted, however, that the air induction system 10 is preferably driven directly by the engine E, for example, the system 10 is drivingly coupled to the crankshaft of the engine E by a belt drive. Moreover, the system 10 is connected to the engine intake, including an intake plenum box B and an intake manifold M, by a conduit C, such that pressurized air generated by the system 10 is directed to the intake. In addition, an intercooler I is preferably in air communication with the conduit C to cool the pressurized air prior to it entering the intake. The principles of the present invention are not limited to the illustrated applications, but rather the inventive system 10 may be utilized in any application in which a highly pressurized, controlled air stream is desired (e.g., various other types of reciprocating engines, etc.). The illustrated air induction system 10 broadly includes a supercharger 12 in communication with a valve assembly. The valve assembly includes a valve 14 and a valve control mechanism 16.

The illustrated supercharger 12 receives air through an air supply opening 18, pressurizes the air in a compressor, and discharges the pressurized air through an air exhaust opening 20. The illustrated supercharger 12 is preferably a centrifugal supercharger including a rotatable impeller and a step-up drive mechanism drivingly coupling the impeller to the engine E. However, the supercharger could be variously configured utilizing any suitable alternative design. Representative superchargers are disclosed in the following filed applications for U.S. Letters Patents (assigned of record to the assignee of the present application): Ser. No. 09/669,018, entitled GEAR DRIVEN SUPERCHARGER HAVING NOISE REDUCING IMPELLER SHAFT; Ser. No. 09/668,223, entitled CENTRIFUGAL SUPERCHARGER HAVING LUBRICATING SLINGER; and Ser. No. 09/706,007, entitled VELOCITY VARIANCE REDUCING MULTIPLE BEARING ARRANGEMENT FOR IMPELLER SHAFT OF CENTRIFUGAL SUPERCHARGER, which are all hereby incorporated by reference herein as is necessary for a full and complete understanding of the present invention. Most preferably, one or more of the supercharger designs disclosed in the foregoing applications will be utilized, as it is believed that they provide a supercharger capable of withstanding the additional operational loads experienced when an inlet valve is incorporated into the induction system. In particular, these supercharger designs provide long-lasting, durable bearing arrangements and a device that is unlikely to catastrophically fail due to the necessary higher operational speeds.

Air is supplied to the supercharger 12 by an inlet comprising an air filter 22, the valve 14, and the air supply opening 18 (see FIG. 1). Air is discharged to the engine E through an outlet comprising the air exhaust opening 20, the conduit C, the intercooler I, the intake box B, and the intake manifold M. Although not illustrated, inlet may alternatively communicate with a forwardly open conduit (not shown) that extends toward the front of the powered vehicle, such that air flow to the supercharger 12 is facilitated when the vehicle is moving in a forward direction. The valve 14 is in air communication with the air supply opening 18 and positioned upstream therefrom. The valve 14 controls the air supply to the supply opening 18, which in turn controls the supply of air discharged to the engine E.

Figure 2:
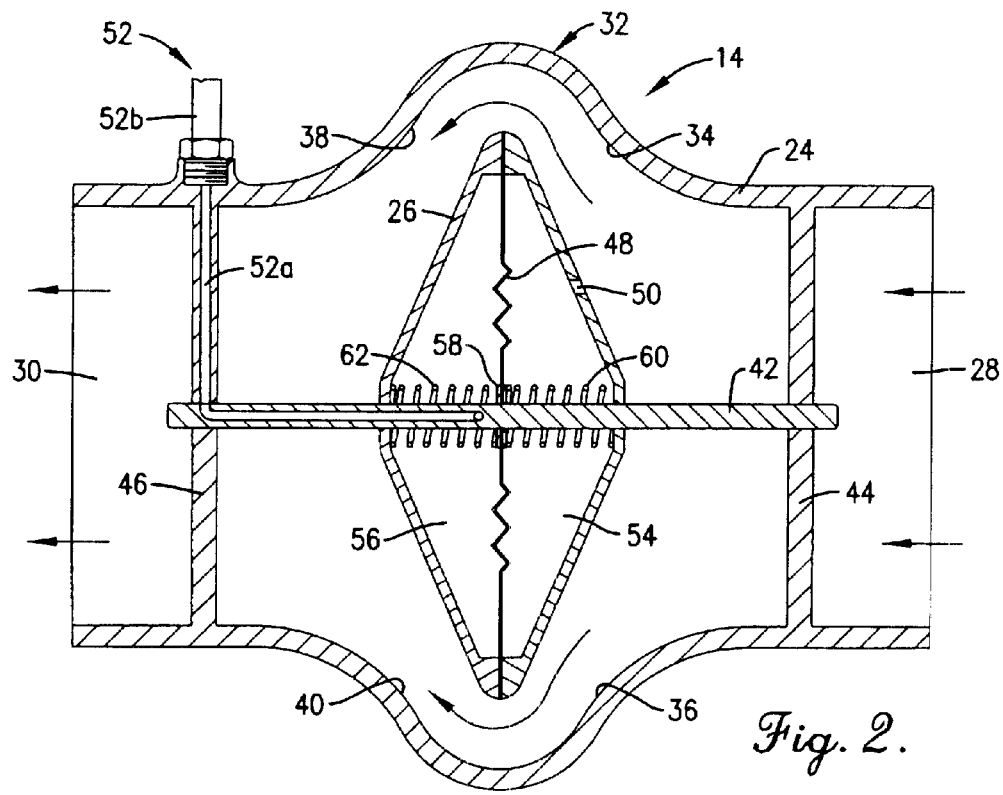
FIG. 2 is an enlarged longitudinal vertical sectional view of the inlet valve assembly of the induction system illustrated in FIG. 1 with a portion of the control mechanism broken away and illustrating the valve in the open position.

In particular, the valve 14 includes a housing 24 and a valve body 26 (see FIG. 2). The housing 24 is generally cylindrically shaped and includes open ports 28,30 on each opposing end. The filter 22 adjoins one end of the housing 24 so that port 28 is in air communication with the filter 22. The opposing end of the housing 24 adjoins the air supply opening 18 of the supercharger 12 so that port 30 is in air communication with the air supply opening 18. For purposes that will subsequently be described, the housing 24 further includes a radially enlarged section 32 defining a diameter that is greater than the diameter of each of the ports 28,30. In this manner, two pairs of shoulders 34,36 and 38,40 are formed on the inside surface of the housing 24. A pair of shoulders is adjacent each of the corresponding ports 28,30. The housing 24 also includes a centrally located axial shaft 42 fixed to the housing 24 by a pair of spokes 44,46. It will be appreciated that each of the spokes 44,46 are configured so that any obstruction of air flow through the housing 24 caused thereby is minimal, although alternative spoke configurations could be utilized (e.g., horizontal spokes, multiple spokes adjacent each port, etc.).

The valve body 26 is slidably mounted on the shaft 42 within the section 32 of the housing 24. The valve body 26 is generally disc shaped having central apertures corresponding to the circumference of the shaft 42 to provide sliding of the valve body 26 relative to the shaft 42. The valve body 26 is generally concentric with the housing 24. The valve body 26 defines a body cross-sectional area that is greater the inner cross-sectional area of each of the ports 28,30 but less than the inner cross-sectional area of the section 32. In this manner, the valve body 26 is shiftable linearly along the shaft 42 between an open position as illustrated in FIG. 2, wherein the valve body 26 is generally coplanar with the center bulge section 32 so that air supply to the supply opening 18 (designated by arrows in FIG. 2) is substantially unrestricted by the valve body 26, and a closed position as illustrated in either of 3 or 4, wherein the valve body 26 is adjacent either pair of shoulders 34,36 (FIG. 4) or 38,40 (FIG. 3) so that air supply to the supply opening 18 is substantially restricted relative to the valve body 26 being in the open position. It will be appreciated that as the valve body 26 moves toward a respective pair of shoulders 34,36 or 38,40, the air supply to the supply opening 18 will become progressively more restricted. Although the illustrated valve 14 is not shown with the valve body 26 physically engaging the paired shoulders 34,36 or 38,40 (nor is it imperative to the present invention), it is possible in application that the shoulders 34,36 or 38,40 actually function as a valve seat and physically engage the valve body 26 so that the air supply to the supply opening 18 is virtually shut off. For purposes that will subsequently be described, the valve body 26 defines a generally sealed internal cavity. It will be appreciated that given the importance of the valve body 26 being able to freely slide relative to the shaft 42, it may not be possible to completely seal the internal cavity relative to the central apertures.

The valve could utilize various alternative designs, configurations, constructions, materials, etc., so long as the valve is operable to control air supply to the supercharger. Any type of suitable flow-control valve could be used utilizing many different housing, body, and seat configurations, for example, a square shaped housing, a simple butterfly valve, etc. However, it is preferred that the selected valve be operable to regulate or control air flow rather than merely being a gate that is either fully open or fully closed.

The valve control mechanism 16 senses air pressure downstream from the supercharger 12. The valve control mechanism causes the valve 14 to vary the air supply to the supply opening 18 depending upon the downstream pressure conditions sensed. In particular, the control mechanism 16 includes a flexible diaphragm 48, an atmosphere reference aperture 50, and an intake reference line 52. The flexible diaphragm 48 is fixed at both ends within the internal cavity of the valve body 26, generally at the center of the valve body 26, so that the diaphragm 48 and the valve body 26 cooperate to define two pneumatically isolated, collapsible chambers 54,56. The diaphragm 48 includes a center aperture to allow insertion of the shaft 42 during assembly, however, once assembled the diaphragm 48 is fixed to the shaft 42 and sealed thereto by a sealing ring 58. The chamber 54 communicates with the atmospheric pressure in the housing 24 by the atmosphere reference aperture 50 so that pressure within the chamber 54 is generally the same as the atmospheric pressure within the housing 24.

The intake reference line 52 is connected at one end to the intake manifold M of the engine E with the other end venting into the chamber 56. In particular, an inner-valve pathway 52a is formed through an upper portion of the axial center of the spoke 46 and through a portion of the axial center of the shaft 42 that extends between the spoke 46 and the chamber 56. The pathway 52a extends radially through the shaft 42 so that the pathway 52a opens into the chamber 56 (see, e.g., FIG. 2). It will be appreciated that the pathway 52a could be formed in a number of different methods (e.g., drilling, molding during formation of the relevant parts, etc.). The inner-valve pathway 52a connects to an outer-valve pathway 52b to complete the reference line 52. The outer-valve pathway is comprised of tubing threadably connected at one end to the exterior of the housing 24 and coupled to the intake manifold M at the other end. In this manner, air pressure in the intake manifold M is communicated through the reference line 52 to the chamber 56 so that pressure within the chamber 56 is generally the same as the pressure within the intake manifold M.

The valve control mechanism 16 causes the valve 14 to vary the air supply to the supply opening 18 depending upon air pressure in the intake manifold M (as communicated to the chamber 56 by the reference line 52) relative to a reference pressure. The reference pressure is the atmospheric pressure in the housing 24 as communicated to the chamber 54 by the aperture 50. In particular, the control mechanism 16 causes the valve body 26 to shift out of the open position toward the closed position illustrated in FIG. 4 (i.e., toward the paired shoulders 34,36) thereby progressively restricting the air supply to the supply opening 18 when the downstream pressure condition is a surge condition. The surge condition occurs when the air pressure in the intake manifold M (and thus the air pressure in the chamber is less than the reference atmospheric pressure in the housing 24 (and thus the air pressure in the chamber 54). The pressure differential caused by the surge condition collapses the chamber 56 while the chamber 54 simultaneously expands. Because the diaphragm 48 is fixed to the shaft 42, the expansion of the chamber 54 causes the valve body 26 to shift toward the paired shoulders 34,36.

Figure 3:
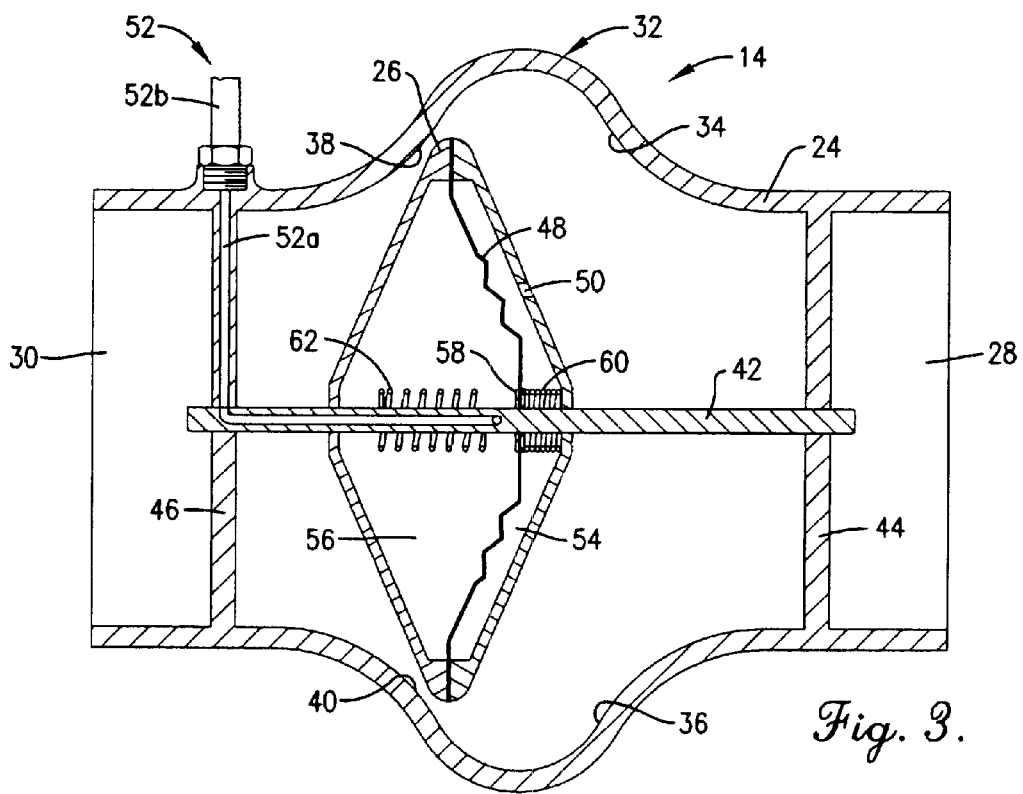
FIG. 3 is an enlarged longitudinal vertical sectional view of the inlet valve assembly with a portion of the control mechanism broken away and illustrating the valve in the over-boost induced closed position.
Figure 4:
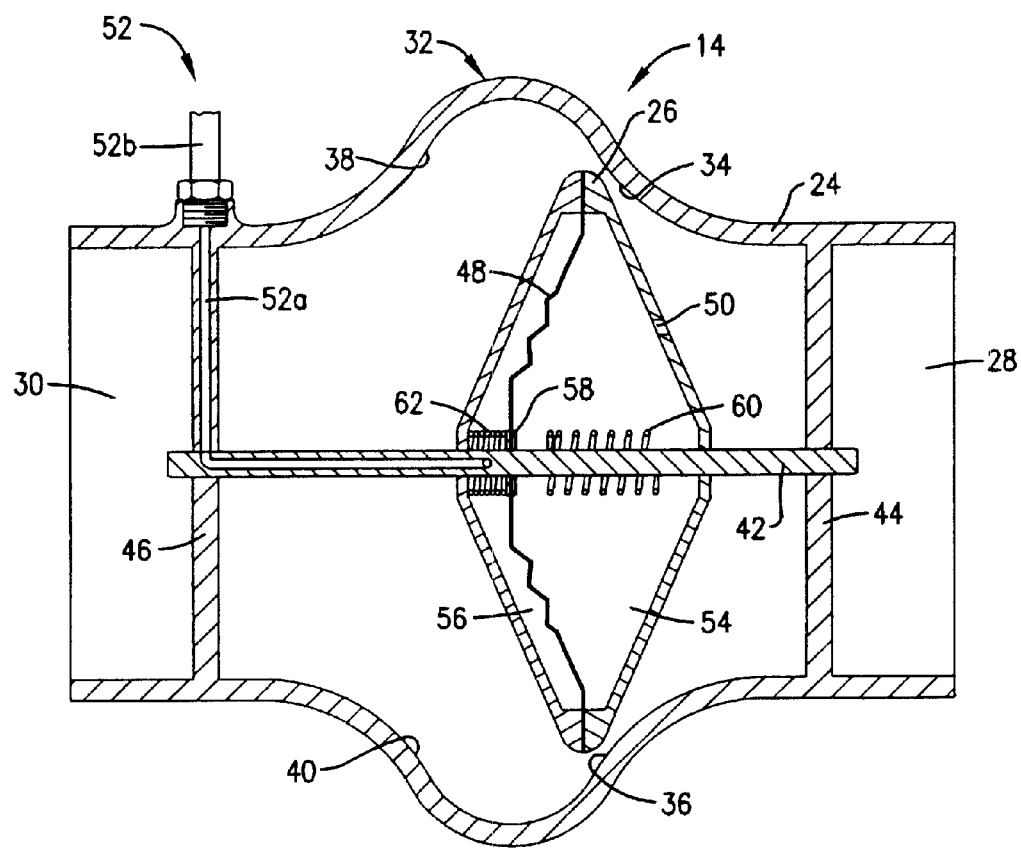
FIG. 4 is an enlarged longitudinal vertical sectional view of the inlet valve assembly with a portion of the control mechanism broken away and illustrating the valve in the surge-induced closed position.

The control mechanism 16 causes the valve body 26 to shift out of the open position toward the closed position illustrated in FIG. 3 (i.e., toward the paired shoulders 38,40) thereby progressively restricting the air supply to the supply 18 when the downstream pressure condition is an over-boost condition. The over-boost condition occurs when the air pressure in the intake manifold M (and thus the air pressure in the chamber 56) is greater than the reference atmospheric pressure in the housing 24 (and thus the air pressure in the chamber 54). The pressure differential caused by the over-boost condition expands the chamber 56 while the chamber 54 simultaneously collapses. Because the diaphragm 48 is fixed to the shaft 42, the expansion of the chamber 56 causes the valve body 26 to shift toward the paired shoulders 38,40.

The valve body 26 is yieldably biased into the open position by a pair of springs 60,62. The springs 60,62 are slidably mounted on the shaft 42, with each spring 60,62 being positioned in a respective one of the chambers 54,56. The springs 60,62 freely float along the shaft 42. In addition to biasing the valve body 26 into the open position, the springs 60,62 also cooperate with the pressure differential between the chambers 54,56 to determine when the valve 14 opens and closes. That is, the pressure differential in the chambers 54,56 must overcome the spring force in the corresponding spring 60,62 in order to collapse and expand the chambers and thereby shift the valve body 26 to a closed position. In this manner, the valve assembly can be tailored to a specific application by selecting a spring, or a pair of springs, having a particular spring force in order to set the conditions in which the valve opens and closes.

The valve control mechanism could utilize various alternative designs, configurations, constructions, etc., so long as the control mechanism is operable to cause the valve to vary the air supply to the supercharger. For example, the valve could be electronically or mechanically controlled. In addition, it is within the ambit of the present invention to utilize a valve control mechanism that does not automatically sense the valve-control conditions, for example, the valve could be remotely controlled by the vehicle operator selecting an open or close function depending on the operator's needs or desires.

In operation, air is drawn through the inlet into the supercharger 12 where it is pressurized and delivered to the engine E through the outlet. The step-up drive powers the supercharger 12 off of the engine E so that the supercharger 12 provides the desired boost at low-end engine speeds (e.g., 10 psi at 2500 rpm). As the engine speed increases, the valve control mechanism 16 causes the valve 14 to shift out of the open position thereby controlling the air supply to the supercharger 12 so that the supercharger 12 provides the desired boost without over-boosting at high-end engine speeds (e.g., 10 psi at 6000 rpm). Should a downstream restriction occur (e.g., the engine throttle closes), the valve control mechanism 16 causes the valve 14 to close thereby controlling the air supply to the supercharger 12 so that undesirable pressure spikes are prevented.

Figure 5:
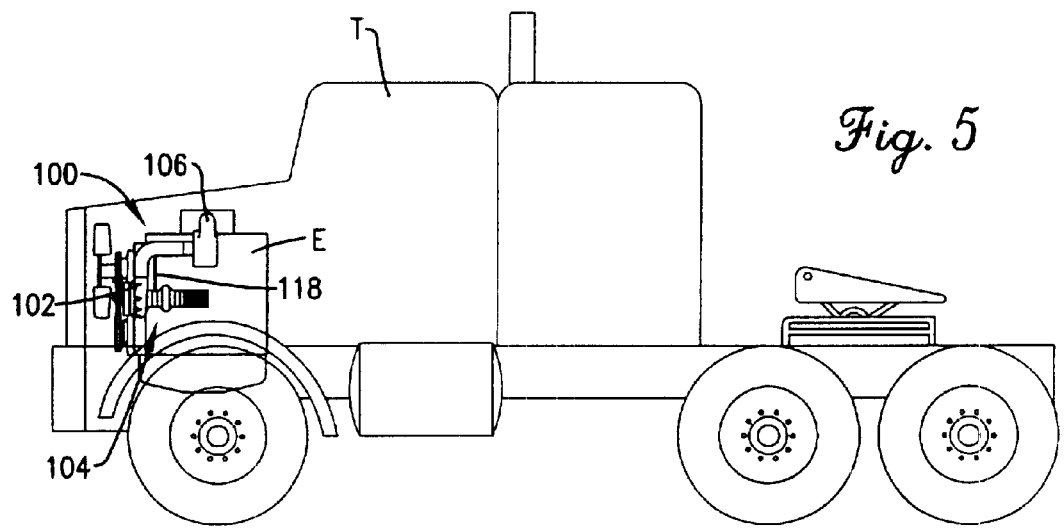
FIG. 5 is a side elevational view of an air induction system constructed in accordance with an alternative embodiment of the present invention and shown in combination with an internal combustion engine in a truck.
Figure 6:
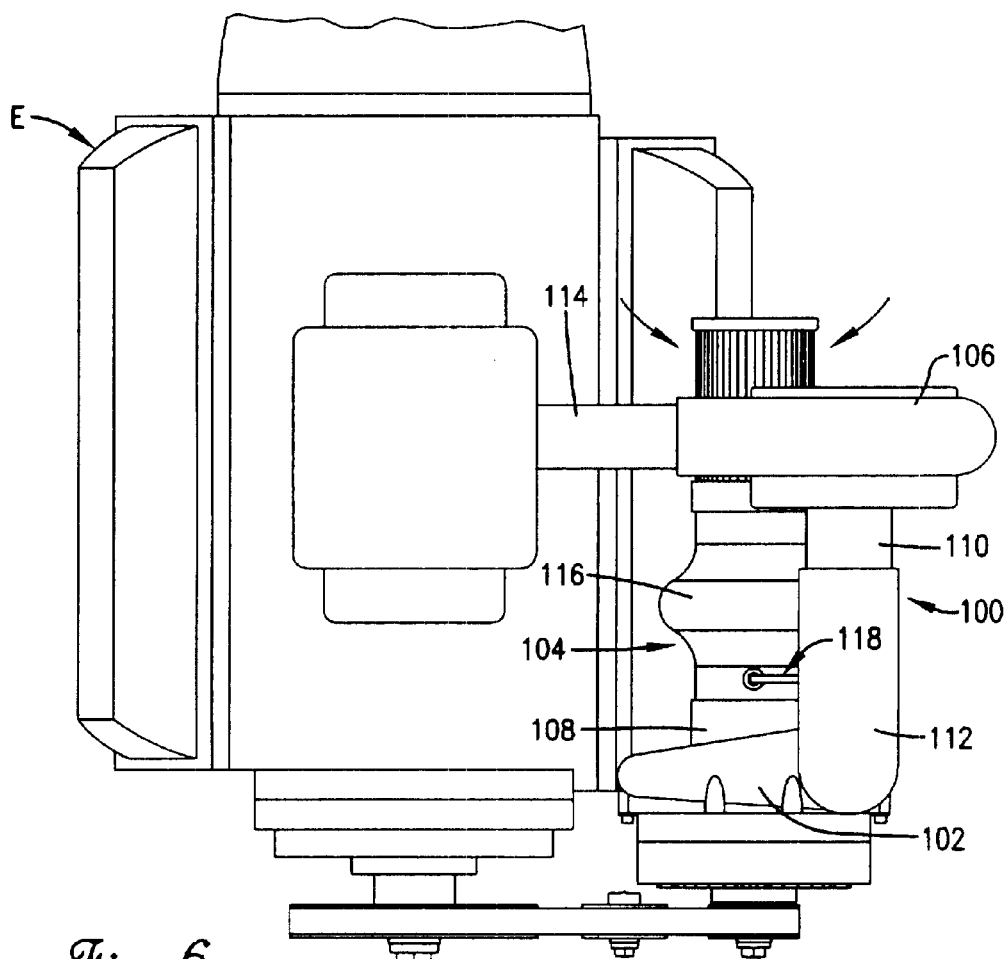
FIG. 6 is an enlarged plan view of the system illustrated in FIG. 5 and shown in combination with the engine (illustrated in a fragmentary and partially schematic view).

The inventive air induction system of the present invention could be configured for many different applications in which a controlled stream of pressurized air is desired. For example, the downstream pressure conditions that control the valve operation could be varied depending on the desired application. One such alternative embodiment is the air induction system 100 illustrated in FIGS. 5 and 6. Turning initially to FIG. 5, the air induction system 100 selected for illustration is shown in use with an internal combustion engine E of a truck T. Although the system 100 could be used in any internal combustion engine, it is most preferably a diesel engine (e.g., the type typically used by the over-the-road trucking industry, road working equipment, etc.). The air induction system 100 broadly includes a supercharger 102 in communication with a valve assembly 104, located upstream from the supercharger 102, and a turbocharger 106, located downstream from the supercharger 102.

The illustrated supercharger 102 is a centrifugal supercharger powered by the crankshaft of the engine E and is substantially similar to the supercharger 12 previously described, however, the air induction system 100 could utilize any suitable supercharger (e.g., Roots-type, screw-type, etc.). The illustrated supercharger 102 receives air through an air supply opening 108, pressurizes the air, and outputs the pressurized air through an air exhaust opening.

The illustrated turbocharger 106 includes an inlet 110 for receiving pressurized air from the supercharger 102 through conduit 112. Although not illustrated, an intercooler (not shown) could be included between the exhaust opening of the supercharger 102 and the inlet 110 of the turbocharger 106. The turbocharger 106 further pressurizes the air received in inlet 110 and delivers it to the engine E through outlet 114. The illustrated turbocharger 106 is a conventional turbocharger powered by the exhaust from the engine E and in this regard is in power communication with the exhaust manifold (not shown) of the engine E. The turbocharger could have many different configurations readily appreciated by those skilled in the art.

The valve assembly 104 is in communication with the air supply opening 108 of the supercharger 102 to vary air supply thereto. The valve assembly 104 is similar to the previously discussed valve assembly (illustrated in FIGS. 1–4) and includes a valve 116 and a valve control mechanism 118. However, the valve control mechanism 118 is coupled between the valve 116 and the inlet 110 of the turbocharger 106 rather than the intake manifold of the engine E. In this manner, the valve control mechanism 118 senses pressure conditions in the inlet 110 of the turbocharger 106. The valve control mechanism 118 causes the valve 116 to progressively restrict the air supply to the supply opening 108 of the supercharger 102 depending upon pressure conditions in the inlet 110 of the turbocharger 106 relative to the atmospheric pressure in the valve 116. The valve 116 controls the air supply to the supply opening 108 of the supercharger 102 so that the air pressure in the inlet 110 of the turbocharger 106 remains substantially constant.

The inventive air induction system 100 compensates for changes in atmospheric pressure occasioned by changes in altitude (e.g., the inlet of the turbocharger receives pressurized air at a substantially constant pressure regardless of atmospheric pressure). In addition to stabilizing the boost in power output by the engine, it is believed using the inventive air induction system to supercharge a turbocharger also increases fuel efficiency and reduces emissions. Supercharging a turbocharger with the inventive system also provides the conventional advantage of providing boost to the turbocharger at low-end engine speeds.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A powered land or marine vehicle comprising:

an internal combustion engine;

a turbocharger including an inlet adapted to receive fluid, said turbocharger being operable to pressurize fluid received through the inlet and deliver the pressurized fluid to the engine;

a centrifugal supercharger drivingly connected to the engine, said supercharger including a fluid supply opening adapted to receive fluid, said supercharger being in communication with said inlet and being operable to pressurize fluid received through the supply opening and deliver the pressurized fluid to the inlet; and a valve assembly including a valve and a valve control mechanism, said valve being in communication with the supply opening and operable to vary fluid supply to the supply opening, said valve control mechanism being operable to cause the valve to vary fluid supply to the supply opening depending upon fluid pressure conditions downstream from the supercharger.

2. The powered vehicle as claimed in claim 1, said engine providing power for propelling the vehicle.

3. The powered vehicle as claimed in claim 1, said turbocharger including an outlet fluidly connected to the engine, with the turbocharger being operable to pressurize the fluid between the inlet and outlet and force the pressurized fluid through the outlet.

4. The powered vehicle as claimed in claim 2, said engine generating an exhaust fluid, said turbocharger being powered by the exhaust fluid of the engine.

5. The powered vehicle as claimed in claim 1, said supercharger including a rotatable impeller which pressurizes the fluid when rotated.

6. The powered vehicle as claimed in claim 1, said valve including a valve body shiftable into and out of an open position, with shifting of the valve body out of the open position progressively restricting fluid supply to the supply opening.

7. The powered vehicle as claimed in claim 6, said valve body being yieldably biased into the open position.

8. The powered vehicle as claimed in claim 1, said valve including a housing presenting a fluid passageway extending an inlet port and an outlet port, wherein the outlet port is fluidly connected to the supply opening of the supercharger, said valve including a valve body shiftably disposed within the housing to vary fluid flow through the passageway.

9. The powered vehicle as claimed in claim 8, said housing presenting a pair of generally opposed valve seats spaced along the passageway, said valve body being shiftably disposed between the seats so that shifting of the valve body toward either of the seats restricts fluid flow through the passageway.

10. The powered vehicle as claimed in claim 9, said housing presenting a radially enlarged section extending between the seats, said passageway presenting a first cross-sectional area at each of the seats and a relatively greater, second cross-sectional area at the enlarged section.

11. The powered vehicle as claimed in claim 10, said valve body being generally disc-shaped and presenting a body cross-sectional area that is greater than the first cross-sectional area of the passageway but less than the second cross-sectional area of the passageway.

12. The powered vehicle as claimed in claim 11, said housing being generally cylindrical in shape, said valve body and said passageway each presenting a circular cross-section, said valve body being concentric with the passageway and shiftable linearly along the length of the passageway.

13. The powered vehicle as claimed in claim 8, said valve control mechanism including a collapsible chamber operable to shift the valve body as the chamber collapses and expands.

14. The powered vehicle as claimed in claim 13, said valve control mechanism including a reference line intercommunicating the inlet and the chamber.

15. The powered vehicle as claimed in claim 13, said valve control mechanism including a flexible diaphragm cooperating with the valve body to define the chamber.

16. The powered vehicle as claimed in claim 15, said body being hollow, said diaphragm being located within the valve body, wherein the valve body and diaphragm cooperatively define an additional collapsible chamber pneumatically isolated from the first-mentioned chamber and cooperating therewith to effect shifting of the valve body.

17. The powered vehicle as claimed in claim 16, each of the chambers being associated with a reference opening for communicating the chamber with a respective reference fluid pressure.

18. The powered vehicle as claimed in claim 1, said valve control mechanism being configured to control the valve so that the pressure of the pressurized fluid delivered to the inlet is maintained substantially constant.

19. The powered vehicle as claimed in claim 18, said valve control mechanism being configured to control the valve to vary fluid supply to the supply opening depending upon pressure conditions at the inlet relative to atmospheric pressure.

20. The powered vehicle as claimed in claim 19, said valve control mechanism including a first fluid pressure sensor that senses fluid pressure at the inlet, said valve control mechanism including a second fluid pressure sensor that senses atmospheric pressure.

21. The powered vehicle as claimed in claim 20, said valve control mechanism including a pair of collapsible chambers that are each associated with a respective one of the pressure sensors so that the chambers cooperatively control opening and closing of the valve.

22. The powered vehicle as claimed in claim 21, said first fluid pressure sensor comprising a reference line intercommunicating the inlet with the respective chamber, said second fluid pressure sensor comprising a reference aperture intercommunicating the respective chamber and atmospheric conditions.

23. The powered vehicle as claimed in claim 1, said valve control mechanism being operable to cause the valve to vary fluid supply to the supply opening depending upon fluid pressure conditions between the supercharger and turbocharger.

\* \* \* \* \*